(12) United States Patent
Schultheiss et al.

(10) Patent No.: US 7,475,764 B2
(45) Date of Patent: Jan. 13, 2009

(54) DEVICE FOR DRIVING A COOLANT PUMP

(75) Inventors: Gerold Schultheiss, Pforzheim (DE); Peter Ambros, Kusterdingen (DE); Rolf Müller, Ludwigsburg (DE); Rudolf Stoklossa, Mühlacker (DE)

(73) Assignee: BEHR GmbH & Co. KG, Stuttgart (DE)

( * ) Notice: Subject to any disclaimer, the term of this patent is extended or adjusted under 35 U.S.C. 154(b) by 126 days.

(21) Appl. No.: 10/521,023

(22) PCT Filed: Jul. 4, 2003

(86) PCT No.: PCT/EP03/07165

§ 371 (c)(1),
(2), (4) Date: Apr. 13, 2005

(87) PCT Pub. No.: WO2004/007923

PCT Pub. Date: Jan. 22, 2004

(65) Prior Publication Data
US 2005/0178635 A1 Aug. 18, 2005

(30) Foreign Application Priority Data
Jul. 12, 2002 (DE) ................. 102 32 138

(51) Int. Cl.
*F01P 5/12* (2006.01)
*F16D 47/06* (2006.01)

(52) U.S. Cl. .............. 192/48.2; 192/48.3; 192/57; 192/82 T; 192/103 R; 417/223

(58) Field of Classification Search ............ None
See application file for complete search history.

(56) References Cited

U.S. PATENT DOCUMENTS

| 3,924,716 | A | * | 12/1975 | Brewer ................ 192/57 |
| 4,526,257 | A | * | 7/1985 | Mueller ............. 192/48.2 |
| 4,926,992 | A | * | 5/1990 | Linnig ............... 192/48.2 |
| 5,105,928 | A | * | 4/1992 | Saeki et al. ........ 192/48.2 |
| 5,586,636 | A | * | 12/1996 | Linnig ............... 192/48.2 |
| 6,007,303 | A | | 12/1999 | Schmidt |
| 6,079,536 | A | * | 6/2000 | Hummel et al. ..... 192/103 R |
| 6,725,812 | B1 | * | 4/2004 | Scott ................ 192/58.4 |
| 6,915,887 | B2 | * | 7/2005 | Faller et al. ........ 192/48.2 |

FOREIGN PATENT DOCUMENTS

| DE | 42 07 709 A1 | * | 9/1993 |
| DE | 197 46 359 A1 | | 7/1998 |
| DE | 199 32 359 A1 | | 2/2000 |
| DE | 199 40 538 A1 | | 4/2001 |
| JP | 59-46379 A | * | 3/1984 |
| JP | 61-119825 A | | 6/1986 |
| JP | 62-210287 A | | 9/1987 |

* cited by examiner

*Primary Examiner*—Rodney H Bonck
(74) *Attorney, Agent, or Firm*—Foley & Lardner LLP

(57) ABSTRACT

The invention relates to a device for driving a coolant pump (2) for the coolant circuit of an internal combustion engine in a motor vehicle comprising a drive train that encompasses a drive wheel (7), a viscous coupling (11), and a drive shaft (3). The inventive driving device is provided with a second coupling (15) which is embodied as a clutch and can be connected to the drive train parallel to the viscous coupling (11), resulting in increased redundancy and two-step rev control.

10 Claims, 2 Drawing Sheets

DEVICE FOR DRIVING A COOLANT PUMP

Figure 1:
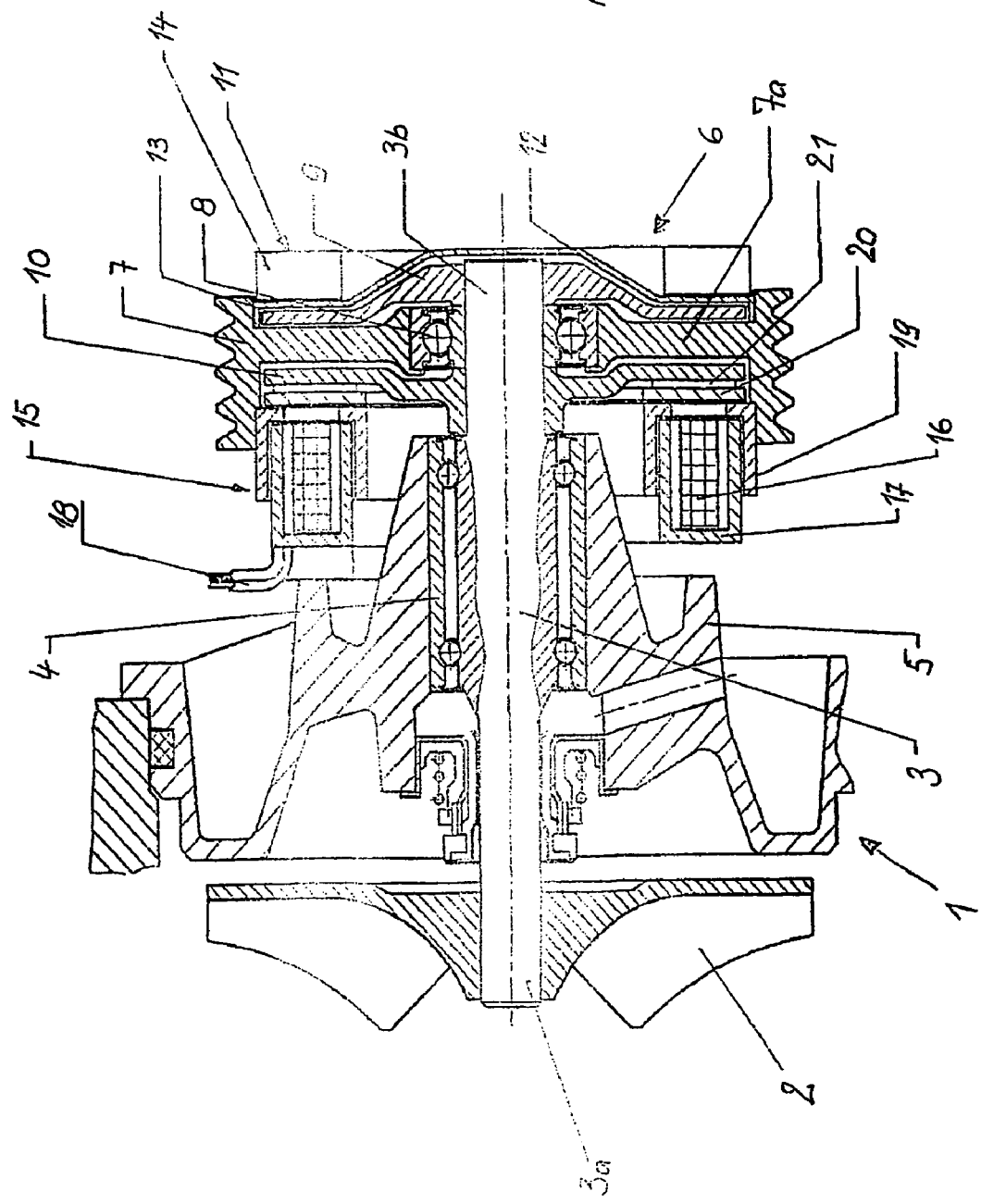

The invention relates to a device for driving a coolant pump for the coolant circuit of an internal combustion engine for a motor vehicle according to the precharacterizing clause of patent claim 1, disclosed by DE-A 199 32 359 by the applicant. In addition, the invention relates to a method for controlling the speed of rotation of a coolant pump for the coolant circuit of an internal combustion engine of a motor vehicle according to the precharacterizing clause of patent claim 9.

DE-A 199 32 359 by the applicant disclosed driving a coolant pump by means of a fluid friction clutch which is integrated into a pulley of a belt drive for driving the coolant pump. This fluid friction clutch, which can be activated electromagnetically, makes it possible to control the speed of rotation of the coolant pump in an infinitely variable manner over the entire range of the speed of rotation, i.e. to match it to the cooling requirement of the engine. However, this coolant pump drive has the disadvantage that, if the fluid friction clutch fails, for example if clutch fluid is lost, torque is no longer transmitted, i.e. the coolant pump drive fails. In this case, the cooling of the engine can no longer be maintained, which may result in damage to the engine. This drive of a coolant pump, in which the fluid friction clutch is connected in series in the drive train, thus lacks redundancy in the event of damage.

DE-A 197 46 359 disclosed a coolant pump which can be regulated and in which a permanent magnetic clutch is connected into the drive train between the belt drive and coolant pump. The regulation of the speed of rotation takes place there in an infinitely variable manner by changing the air gap of this magnetic or eddy-current clutch. This drive also lacks the necessary redundancy if the clutch fails.

Finally, DE-A 199 40 538 disclosed a further coolant pump drive, in which the transmission and regulation of torque takes place in stages by means of a magnetically activatable fluid friction clutch. This coolant pump drive is also affected by the disadvantage of lacking redundancy.

It is the object of the present invention to provide a device for driving a coolant pump of the type mentioned at the beginning which, on the one hand, allows the speed of rotation of the pump to be adequately regulated and, with low costs and outlay on production, ensures increased safety in the case of failure (redundancy). It is also the object of the invention to provide a method for controlling the speed of rotation of the coolant pump, which method permits a means of control which is matched to the cooling requirement of the engine.

The parallel connection of a second clutch into the drive train gives rise, in the event of the first clutch failing, to the necessary redundancy, i.e. the coolant pump continues to be driven, and the cooling of the engine is ensured. This, of course, also applies in the reverse situation; if the second clutch fails, the first, i.e. the fluid friction clutch, takes over the driving of the coolant pump at a reduced speed of rotation. Since the second or additional clutch run synchronously with the speed of rotation of the pulley and the output speed of rotation of the fluid friction clutch is reduced in comparison to the speed of rotation of the pulley, overall a two-stage drive arises for the coolant pump, i.e. the pump can be driven at a reduced speed of rotation in a first stage and at a speed of rotation which is synchronous with the pulley in a second stage. The reduced speed of rotation, i.e. the step-down ratio with respect to the speed of rotation of the pulley, can be set by the configuration of the fluid friction clutch, e.g. by selection of the viscosity, the friction gap and other parameters which, as is generally known, determine the slip of a fluid friction clutch of this type. The second or additional clutch is generally a release clutch which, when there is a corresponding requirement for the higher speed of rotation, is switched on automatically or as required. A two-stage drive of this type is sufficient for most situations and therefore constitutes a cost-effective compromise.

According to one advantageous development of the invention, the release clutch is designed as an electromagnetic clutch which is robust in operation and can be activated in a simple manner and can be accommodated in a structurally favorable manner in or on the pulley of the belt drive. In an advantageous development of the invention, the electromagnetic clutch is arranged on one side of the pulley, i.e. the coolant pump side, and the fluid friction clutch is arranged on the other side. This results in a symmetrical construction for the assembly of the two clutches together with the pulley and in a short bearing clearance for the floating mounting of the pulley on the drive shaft.

According to a further advantageous development of the invention, the pulley in conjunction with the two clutches is designed as a preassembled constructional unit which is mounted on a hollow shaft and can be connected in a simple manner via this hollow shaft to the drive shaft for the coolant pump impeller. This drive unit can then also be used for driving other accessories, e.g. a power-steering pump or a compressor for an air-conditioning system, i.e. also for those applications in which operation of two different speed-of-rotation stages is advantageous.

The method according to the invention proposes a two-stage drive, in which switching over from one stage to the other stage can take place in each case as a function of different parameters. On the one hand, the coolant pump—or else other assemblies—can be driven at a reduced speed if the full speed of rotation is not required for the cooling or would even be harmful, i.e. the coolant pump impeller would incur cavitation damage. On the other hand, the coolant pump can be driven at an increased speed of rotation if this is required on account of increased coolant temperature, oil temperature, engine load or other parameters.

Exemplary embodiments of the invention are illustrated in the drawing and are described in greater detail below. In the drawing FIG. 1 shows a coolant pump drive with a continuous drive shaft, and FIG. 2 shows a modified coolant pump drive with a preassembled drive unit.

FIG. 1 shows a drive 1 for a coolant pump for a coolant circuit (not illustrated) of an internal combustion engine of a motor vehicle. A coolant pump impeller 2 is fastened to the left shaft end 3*a* of a drive shaft 3 which, for its part, is mounted rotatably in a bearing housing 5 via a coolant pump bearing 4. A drive unit 6 which serves to drive the coolant pump impeller 2 is fastened on the other shaft end 3*b* of the drive shaft 3 (also called coolant pump shaft). The drive unit 6 has a drive wheel which is designed as a pulley 7 and is mounted rotatably on the shaft end 3*b* of the drive shaft 3 via a ball bearing 8. The pulley 7 is driven by the internal combustion engine of the motor vehicle using a belt drive (not illustrated), i.e. by a direct mechanical drive with a fixed ratio of the speed of rotation. The pulley 7 is of approximately T-shaped design in cross section and has a web 7*a* with, arranged on its right and left side, a respective driving disk 9, 10 which, for their part, are connected fixedly to the shaft end 3*b* of the drive shaft 3. The right driving disk 9 is part of a fluid friction clutch 11 which is composed of the abovementioned web 7*a* of the pulley 7 and of a cover 12 which is inserted in a fluid-tight manner into the pulley 7, so that it delimits a closed working space 13 which is filled with a viscous medium (silicone oil). Cooling ribs 14 for conducting away the fluid friction heat are arranged on the outside of the cover 12. The driving disk 10 arranged on the left side of the web 7*a* is part of an electromagnetic clutch 15 which has a positionally fixed magnet coil 16 which is accommodated in a coil housing 17 which is fastened to the bearing housing 5 and has a current-carrying means 18. The rotating part of the electromagnetic clutch 15 comprises magnetic-flux-guiding rings 19, which are fastened to the pulley 7, and a magnetic armature 20, which is connected in an axially movable, but rotationally fixed manner to the driving disk 10 via leaf springs 21.

Figure 2:
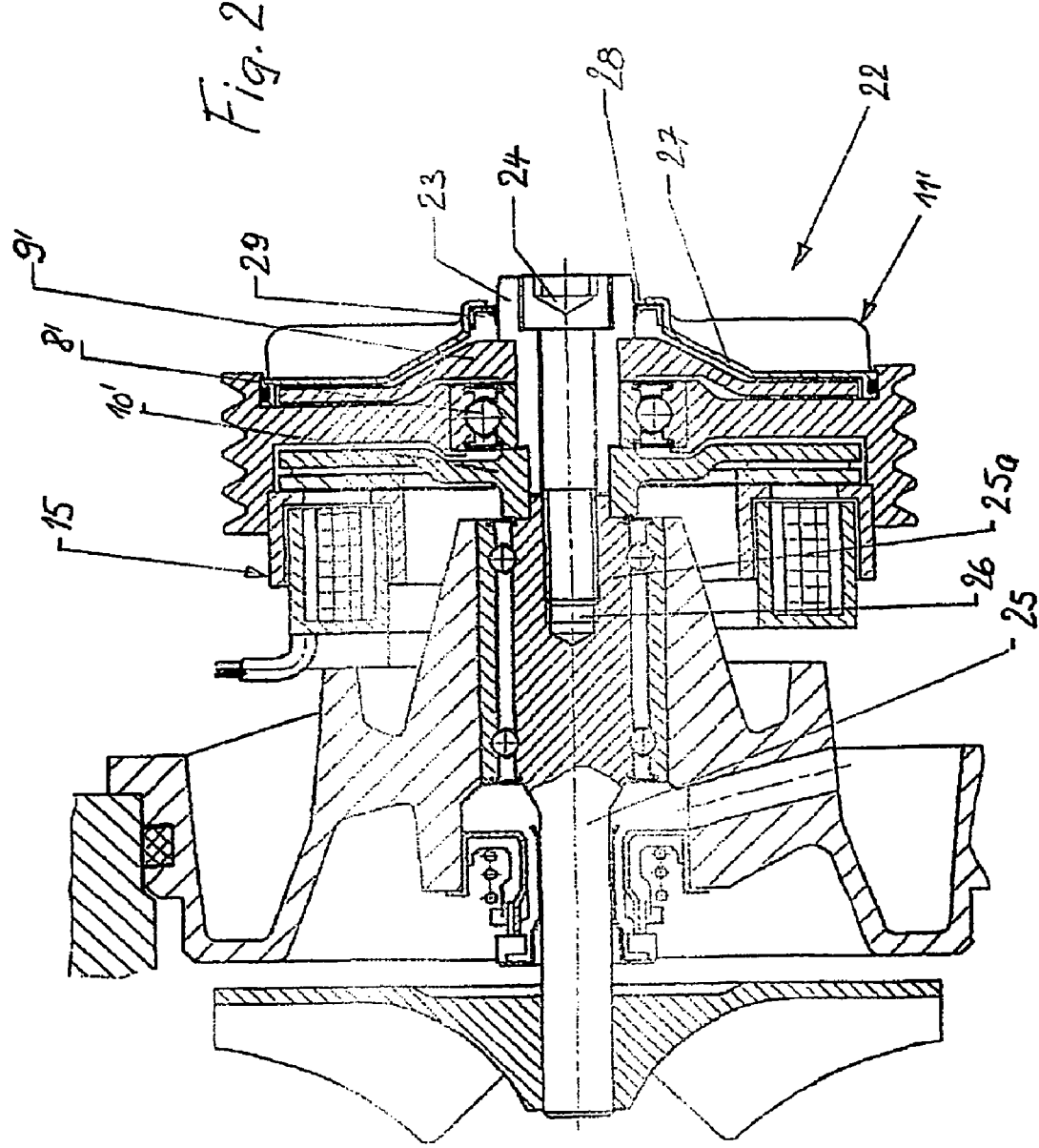

FIG. 2 shows a modified exemplary embodiment of the invention, the same reference numbers being used for the same parts. This exemplary embodiment of the coolant pump drive has a preassembled drive unit 22 which is mounted on a hollow shaft 23 and is connected fixedly to a coolant pump shaft 25 by means of a central screw bolt 24. The screw bolt 24 is screwed into a threaded blind hole 26 of the shaft end 25*a* of the coolant pump shaft 25 and therefore braces the hollow shaft 23 with the driving disks 9', 10' mounted thereon and with the bearing 8' (inner bearing ring) against the end surface of the shaft end 25*a*. In this case, a centering of the hollow shaft 23 with respect to the coolant pump shaft 25 takes place at the same time via the hub of the driving disk 10'. In order to ensure the installation of the drive unit 22 by means of the central screw bolt 24 and the hollow shaft 23, the fluid friction clutch 11' has a cover which has, in its central region, a passage opening 28 in which the hollow shaft 23, which is sealed off via a shaft sealing ring 29, revolves. The other clutch, i.e. the electromagnetic clutch 15, is unchanged, apart from the somewhat modified driving disk 10', from the exemplary embodiment according to FIG. 1. This construction of the drive unit 22 on a hollow shaft 23 permits all of the parts—with the exception of the positionally fixed magnet coil—to be preassembled, so that this drive unit 22 can be supplied and fitted as a complete constructional unit. As already mentioned, this constructional unit 22 may also be used for driving other accessories in the motor vehicle for which such a regulation in stages of the speed of rotation is advantageous.

The functioning of the coolant drive of both exemplary embodiments according to FIGS. 1 and 2 is the same and is described below: if the magnet coil 16 is not energized via the current-supply means 18, the electromagnetic clutch 15 is disengaged., i.e. torque is not transmitted from the pulley 7 to the driving disk 10 and therefore also is not transmitted to the coolant pump shaft 3. By contrast, the fluid friction clutch 11 is in operation, i.e. a frictional moment is transmitted via the silicone oil in the working space 13 from the pulley 7 and the cover 12 connected to it to the driving disk 9, so that the coolant pump shaft 3 is driven—although at reduced speed of rotation in comparison to the speed of rotation of the pulley 7.

The difference in speed of rotation between the driving disk 9 and the pulley 7 results from the known slip of a fluid friction clutch and is dependent on various factors, e.g. the viscosity of the silicone oil, gap width or load. The slip which can therefore be influenced gives rise, as it were, to the step-down ratio for the reduced speed of rotation. If then—on account of predetermined parameters—an increased speed of rotation is required, i.e. that of stage 2, the electromagnetic clutch 15 is energized, so that the clutch 15 engages. The engagement or coupling-in takes place in such a manner that the magnet armature 20 is attracted counter to the force of the leaf springs 21 towards the magnetic-flux-guiding rings 19 where it generates a normal press-on force which carries along the driving disk 10 via the leaf springs 21 in a slip-free manner. The coolant pump impeller 2 therefore runs synchronously with the pulley 7. The fluid friction clutch 11 therefore becomes "automatically inoperative", i.e. it is bridged by the magnetic clutch 15. If the magnetic clutch 15 is disengaged again by interruption of the supply of current, the fluid friction clutch 1 becomes operative again automatically, i.e. on account of the slip which then occurs, i.e. the pump impeller 2 is driven at a reduced speed of rotation. The switching over from one stage to the other takes place via a control unit (not illustrated here) into which certain parameters of the engine or of the motor vehicle are input as limit values, e.g. the coolant temperature, the engine oil temperature, the loading of the engine, i.e. its load moment, the speed of rotation of the engine, the ratio of the engine power to the coolant temperature and the ratio of the engine power to the speed of rotation of the engine. If, for example, the speed of rotation of the engine exceeds a certain maximum value, then switching over from stage 2 to stage 1 takes place, so that the pump impeller rotates at a reduced speed of rotation. As a result, the coolant pump is protected against cavitation and erosion. In addition to the abovementioned parameters, switching over may be advantageous in the following situations: if there is an increased heating requirement, stage 2 may be switched to. During a braking operation of the engine or retarding operation stage 2 may likewise be switched to in order to better conduct away heat via the coolant. Finally, a switching over into stage 2 may also be advantageous during a cold start of the engine in order to overcome the relatively great rotational resistance of the pump as a consequence of the coolant becoming salted up.

The invention claimed is:

1. A device for driving a coolant pump for the coolant circuit of an internal combustion engine for a motor vehicle, the device comprising a drive train having a drive wheel, a first clutch comprising a fluid friction clutch and a drive shaft for driving the coolant pump, the device comprising:
   a) a second clutch which comprises an electromagnetic clutch and which is connected into the drive train parallel to the fluid friction clutch,
   b) the drive wheel which comprises a pulley with a web, and wherein
   c) the fluid friction clutch and the electromagnetic clutch each comprise a driving disk which can be driven by the pulley,
   d) the fluid friction clutch and the electromagnetic clutch are arranged on opposite sides of the web and the driving disks are fastened on the drive shaft, and
   e) the drive shaft is mounted rotatably in a bearing housing which comprises a coolant pump impeller fastened to a driven end of the drive shaft and the driving disks fastened to a driving end of the drive shaft.

2. The device as claimed in claim 1, wherein the driving disk of the fluid friction clutch is arranged rotatably in a working space which is formed by the pulley, the web thereof and a cover and is filled with viscous fluid.

3. The device as claimed in claim 1, wherein the pulley together with the fluid friction clutch and the rotating part of the electromagnetic clutch is designed as a drive unit which is preassembled and can be plugged onto the drive shaft.

4. The device as claimed in claim 3, wherein the drive unit is mounted on a hollow shaft and is connected to the drive shaft via the hollow shaft by means of a central connecting member.

5. A method for controlling the speed of rotation of a coolant pump for the coolant circuit of an internal combustion engine of a motor vehicle, the coolant pump being driven mechanically by the internal combustion engine via a belt drive, the method being carried out by a device according to claim 1, and the method comprising:

driving the coolant pump in a first stage at a first lower speed of rotation and in a second stage at a second higher speed of rotation, and switching over from one stage to the other as a function of at least one parameter of the internal combustion engine.

6. The method as claimed in claim 5, wherein the switching over from the first stage to the second stage takes place when a value for at least one of the following parameters exceeds a predetermined limit value:

coolant temperature, engine oil temperature, engine torque, ratio of engine power to coolant temperature, and ratio of engine power to speed of rotation of the engine.

7. The method as claimed in claim 5, wherein the switching over from the second stage to the first stage takes place when a limit value for the speed of rotation of the engine is exceeded.

8. A device for driving a coolant pump for the coolant circuit of an internal combustion engine for a motor vehicle, the device comprising a drive train having a drive wheel, a first clutch comprising a fluid friction clutch and a drive shaft for driving the coolant pump, the device comprising:

a) a second clutch which comprises an electromagnetic clutch and which is connected into the drive train parallel to the fluid friction clutch, b) the drive wheel which comprises a pulley with a web, and wherein c) the fluid friction clutch and the electromagnetic clutch each comprise a driving disk which can be driven by the pulley, d) the fluid friction clutch and the electromagnetic clutch are arranged on opposite sides of the web and the driving disks are fastened on the drive shaft, and e) the electromagnetic clutch further comprises a positionally fixed magnet coil, magnetic-flux-guiding rings connected to the pulley and a magnet armature which is connected in an axially movable, but rotationally fixed manner to the driving disk via leaf springs.

9. The device as claimed in claim 8, wherein the electromagnetic clutch is arranged between pulley and coolant pump impeller, and the magnet coil is fastened to the bearing housing.

10. A device for driving a coolant pump for the coolant circuit of an internal combustion engine for a motor vehicle, the device comprising a drive train having a drive wheel, a first clutch comprising a fluid friction clutch and a drive shaft for driving the coolant pump, the device comprising:

a) a second clutch which comprises an electromagnetic clutch and which is connected into the drive train parallel to the fluid friction clutch, b) the drive wheel which comprises a pulley with a central web, and wherein c) the fluid friction clutch and the electromagnetic clutch each comprise a driving disk which can be driven by the pulley, and d) the fluid friction clutch and the electromagnetic clutch are arranged on opposite sides of the web and the driving disks are fastened on the drive shaft, wherein the drive shaft is mounted rotatably in a bearing housing which comprises a coolant pump impeller fastened to a driven end of the drive shaft and the driving disks fastened to a driving end of the drive shaft.

\* \* \* \* \*